Patented Dec. 30, 1924.

1,520,934

UNITED STATES PATENT OFFICE.

EUGENE T. CRAINE, OF LOS ANGELES, CALIFORNIA.

CHECK FILLER OR SURFACER FOR REFINISHING VARNISHED AND LIKE ARTICLES.

No Drawing. Application filed October 9, 1919, Serial No. 329,435. Renewed March 19, 1924.

*To all whom it may concern:*

Be it known that I, EUGENE T. CRAINE, a citizen of the United States, residing at Los Angeles, in the county of Los Angeles and State of California, have invented a new and useful Composition of Matter to be Used as a Check Filler or Surfacer for Refinishing Varnished and like Articles, of which the following is a specification.

This invention has for its object to provide a check filler and surfacer for use in the refinishing of furniture, pianos, motor cars and the like, by the use of which it is possible to restore the finish thereof after the checking, scratching or other damage of finished surfaces incident to use.

I am aware that compositions for polishing which often depend upon the softening or dissolving of and blending with the original varnish on the article to be refinished are in use, and my composition is not to be confounded with such blending compounds as to the manner in which it acts upon the surfaces to be treated, and is preferably used in a totally different manner as will be apparent from the disclosure hereinafter made.

My check filler and surfacer consists of the following ingredients, preferably combined in the proportions stated, viz:

1 pound of gum sandarac dissolved in one quart of alcohol.

2 ounces of a solution of Bismarck brown in alcohol.

1 ounce of a solution of nigrosene in alcohol.

Sufficient alcohol added to the above ingredients to make 1 gallon.

These ingredients are placed in a suitable container in the order given, the solutions of Bismarck brown and nigrosene being made, in each instance, by dissolving as much of each such ingredient in alcohol as is required to make a saturated solution. After all the ingredients are in the container the composition is agitated to thoroughly mingle the ingredients.

In the use of my check filler and surfacer in refinishing checked surfaces, I first touch up the spots or checks with any proper coloring matter or stain to match the undamaged surfaces, then apply my check filler and surfacer, with a soft brush, all over the piano, piece of furniture, motor car or the like being refinished, allow the check filler to dry ten or twelve hours, then sandpaper the entire surface down to the original surface or to the old body of varnish with fine polishing paper, and finally revarnish the entire surface with any suitable or preferred varnish.

By carefully following the above directions, badly checked or marred varnished surfaces may be restored to a finish equal to their original finish.

Having thus disclosed my invention, I claim and desire to secure by Letters Patent:

1. The herein described check filler and surfacer for refinishing varnished surfaces, consisting of gum sandarac, Bismarck brown, nigrosene, and alcohol.

2. The herein described check filler and surfacer for refinishing varnished surfaces, comprising the following ingredients in approximately the following proportions; one pound of gum sandarac, two ounces of solution of Bismarck brown, one ounce of solution of nigrosene, and alcohol to make one gallon.

In testimony whereof, I have signed my name to this specification in the presence of two subscribing witnesses.

EUGENE T. CRAINE.

Witnesses:
  ARTHUR C. VERGE,
  ALFRED H. DAEHLER.